US012609886B2

(12) United States Patent
Geng et al.

(10) Patent No.: US 12,609,886 B2
(45) Date of Patent: Apr. 21, 2026

(54) MULTICAST PACKET PROCESSING METHOD, RELATED APPARATUS, AND DEVICE

(71) Applicant: HUAWEI TECHNOLOGIES CO., LTD., Shenzhen (CN)

(72) Inventors: Xuesong Geng, Beijing (CN); Zhenbin Li, Beijing (CN); Jingrong Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 253 days.

(21) Appl. No.: 18/616,734

(22) Filed: Mar. 26, 2024

(65) Prior Publication Data
US 2024/0235985 A1 Jul. 11, 2024

Related U.S. Application Data

(63) Continuation of application No. PCT/CN2022/096544, filed on Jun. 1, 2022.

(30) Foreign Application Priority Data

Sep. 27, 2021 (CN) .......................... 202111134664.3
Oct. 20, 2021 (CN) .......................... 202111223552.5

(51) Int. Cl.
*G06F 15/16* (2006.01)
*G06F 9/54* (2006.01)
(Continued)

(52) U.S. Cl.
CPC .............. *H04L 45/16* (2013.01); *H04L 45/34* (2013.01)

(58) Field of Classification Search
CPC ..... H04L 45/16; H04L 45/34; H04L 12/1854; H04L 12/1886
(Continued)

(56) References Cited

U.S. PATENT DOCUMENTS 6,757,294 B1 * 6/2004 Maruyama .............. H04L 45/16
370/408
7,106,735 B2 * 9/2006 Yagyu ................. H04L 12/1836
370/390
(Continued)

FOREIGN PATENT DOCUMENTS

CN        105099959 A * 11/2015 ............. H04L 49/30
EP         1128605 A2 * 8/2001 ............. H04L 45/00
(Continued)

OTHER PUBLICATIONS

Extended European Search Report in European Appln. No. 22871455. 6, mailed on Nov. 25, 2024, 9 pages.

*Primary Examiner* — Hamza N Algibhah
(74) *Attorney, Agent, or Firm* — Fish & Richardson P.C.

(57) ABSTRACT

The present disclosure relates to multicast packet processing methods. One example method includes obtaining a first multicast packet, where destination information of the first multicast packet includes a first identifier indicating link information, a second identifier indicating a replication and forwarding operation, and a third identifier used to index destination information corresponding to a second node, obtaining a second multicast packet based on the first multicast packet and the third identifier, obtaining a third multicast packet, where destination information of the third multicast packet is destination information corresponding to a third node that is determined based on a destination information index corresponding to a multicast packet obtained after the first multicast packet is replicated, sending the second multicast packet to the second node based on the first identifier, and sending the third multicast packet to the third node based on the destination information of the multicast packet.

20 Claims, 7 Drawing Sheets

(51) Int. Cl.
*H04L 29/06* (2006.01)
*H04L 45/00* (2022.01)
*H04L 45/16* (2022.01)

(58) Field of Classification Search
USPC .......................................................... 709/238
See application file for complete search history.

(56) References Cited

U.S. PATENT DOCUMENTS

| | | | | |
|---|---|---|---|---|
| 7,263,099 B1 * | 8/2007 | Woo | ..................... | H04L 12/1854 370/432 |
| 7,289,503 B1 * | 10/2007 | Sindhu | ................ | H04L 12/1854 370/392 |
| 7,710,963 B1 * | 5/2010 | Jain | ........................ | H04L 49/201 370/432 |
| 8,238,344 B1 * | 8/2012 | Chen | ........................ | H04L 12/18 370/395.31 |
| 8,520,675 B1 * | 8/2013 | Frailong | ................. | H04L 49/90 370/391 |
| 9,628,293 B2 * | 4/2017 | Yu | ........................ | H04L 12/4641 |
| 11,075,774 B2 * | 7/2021 | Gao | .................... | H04L 12/1886 |
| 11,323,280 B2 * | 5/2022 | Van De Velde | ........ | H04L 45/16 |
| 11,695,687 B2 * | 7/2023 | Kaplan | .............. | H04L 12/1881 370/351 |
| 2002/0021697 A1 * | 2/2002 | Tsuchiya | ............... | H04L 61/251 370/392 |
| 2006/0203818 A1 * | 9/2006 | Chen | ..................... | H04L 49/201 370/390 |
| 2010/0142529 A1 * | 6/2010 | Huang | .................... | H04L 12/18 370/390 |
| 2010/0165990 A1 * | 7/2010 | Sindhu | .................... | H04L 12/66 370/390 |
| 2011/0085548 A1 * | 4/2011 | Fernandez | ............. | H04L 12/18 370/390 |
| 2011/0170542 A1 * | 7/2011 | Liu | ......................... | H04L 47/22 370/390 |
| 2014/0044128 A1 * | 2/2014 | Suresh | ................ | H04L 12/1854 370/390 |
| 2016/0254988 A1 * | 9/2016 | Eckert | .................... | H04L 45/02 370/390 |
| 2018/0241671 A1 * | 8/2018 | Bosch | .................... | H04L 69/22 |
| 2019/0386850 A1 * | 12/2019 | Zhang | .................... | H04L 45/50 |
| 2019/0394056 A1 * | 12/2019 | Xie | ........................ | H04W 72/30 |
| 2020/0228361 A1 * | 7/2020 | Jiang | .................. | H04L 41/0654 |
| 2021/0044514 A1 * | 2/2021 | Xie | ..................... | H04L 12/4633 |
| 2023/0036715 A1 * | 2/2023 | Sinha | ................ | H04L 12/1804 |
| 2023/0127464 A1 * | 4/2023 | Xiong | .................. | H04L 45/566 709/238 |

FOREIGN PATENT DOCUMENTS

| | | | | | |
|---|---|---|---|---|---|
| EP | | 3113427 B1 * | 5/2018 | ............ | H04L 45/48 |
| JP | | 2006324981 A * | 11/2006 | | |
| JP | | 2007274332 A * | 10/2007 | | |
| WO | WO-2013037303 A1 * | | 3/2013 | ........ | H04L 12/1886 |
| WO | WO-2018014710 A1 * | | 1/2018 | | |
| WO | WO-2022199294 A1 * | | 9/2022 | ............ | H04L 45/16 |

* cited by examiner

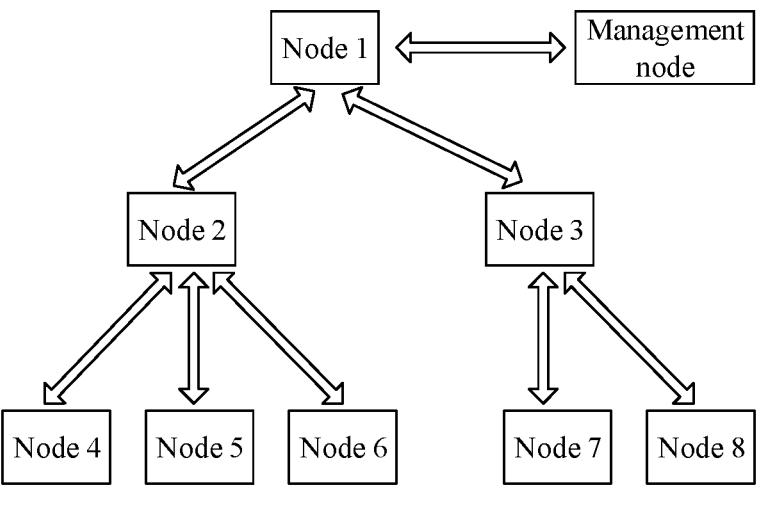

FIG. 1

Obtain a first multicast packet, where destination information of the first multicast packet includes a first identifier, a second identifier, and a third identifier, the first identifier indicates link information, the second identifier indicates a replication and forwarding operation, and the third identifier is used to index destination information corresponding to a second node ⟋ 201

Obtain a second multicast packet based on the first multicast packet and the third identifier, where destination information of the second multicast packet is the destination information corresponding to the second node ⟋ 202

Obtain a third multicast packet based on the first multicast packet and the second identifier, where destination information of the third multicast packet is destination information corresponding to a third node that is determined based on a destination information index corresponding to a multicast packet obtained after the first multicast packet is replicated ⟋ 203

Send the second multicast packet to the second node based on a link indicated by the first identifier ⟋ 204

Send the third multicast packet to the third node based on a link indicated by destination information of the multicast packet that is obtained after the first multicast packet is replicated ⟋ 205

FIG. 2

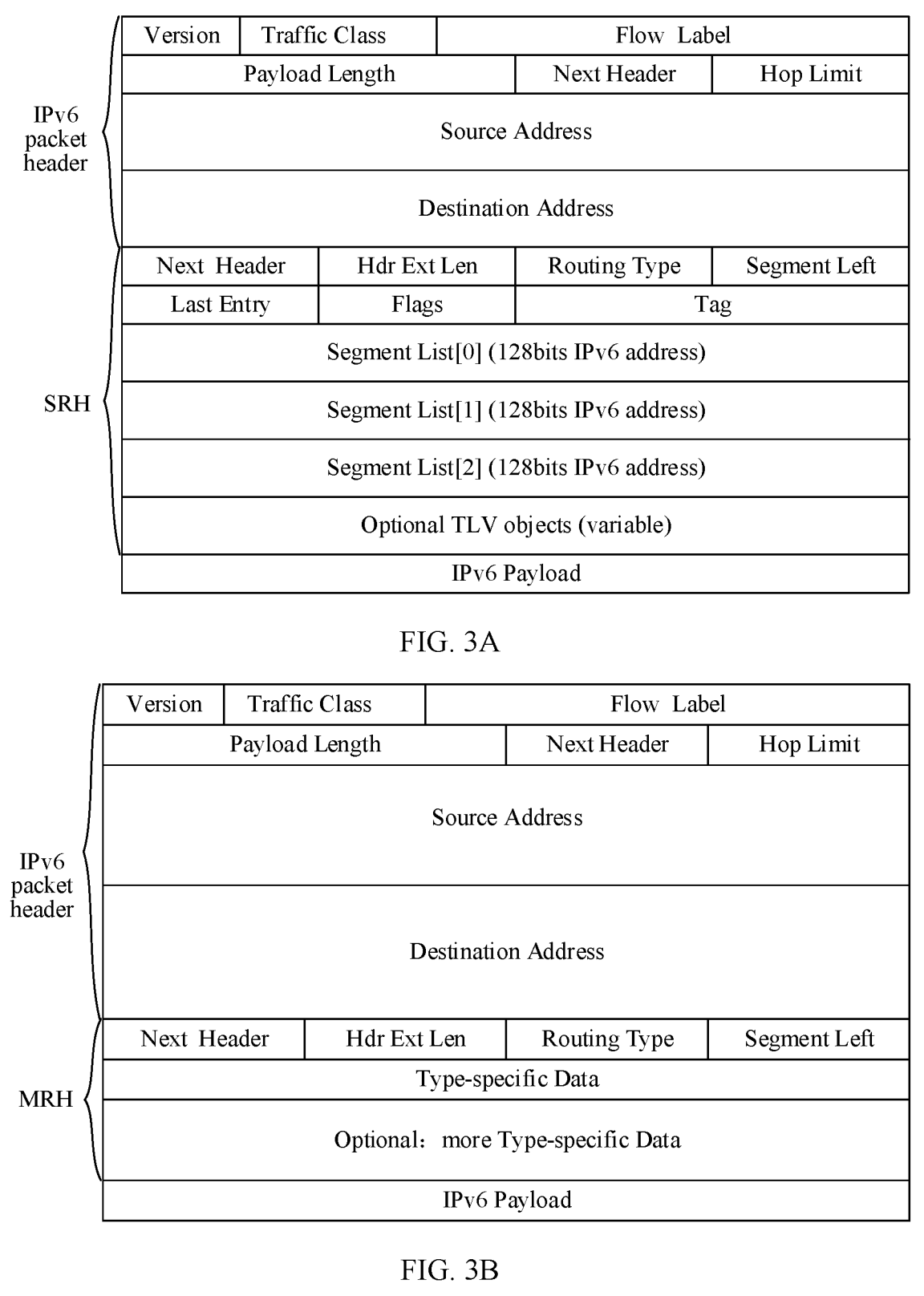

IPv6 packet header

| Version | Traffic Class | Flow Label | |
|---|---|---|---|
| Payload Length | | Next Header | Hop Limit |
| Source Address | | | |
| Destination Address | | | |

SRH

| Next Header | Hdr Ext Len | Routing Type | Segment Left |
|---|---|---|---|
| Last Entry | Flags | Tag | |
| Segment List[0] (128bits IPv6 address) | | | |
| Segment List[1] (128bits IPv6 address) | | | |
| Segment List[2] (128bits IPv6 address) | | | |
| Optional TLV objects (variable) | | | |

| IPv6 Payload |
|---|

FIG. 3A

IPv6 packet header

| Version | Traffic Class | Flow Label | |
|---|---|---|---|
| Payload Length | | Next Header | Hop Limit |
| Source Address | | | |
| Destination Address | | | |

MRH

| Next Header | Hdr Ext Len | Routing Type | Segment Left |
|---|---|---|---|
| Type-specific Data | | | |
| Optional: more Type-specific Data | | | |

| IPv6 Payload |
|---|

FIG. 3B

| Locator | Function | Pointer | Number | SL |
|---------|----------|---------|--------|-----|
| A1 | End.RL.X | 3 | 1 | 1 |
| A2 | End.RL.X | 6 | 0 | 2 |
| B1 | End.RL.X | 8 | 2 | 3 |
| B2 | End.RL.X | 9 | 0 | 4 |
| B3 | End.RL.X | 10 | 0 | 5 |
| C1 | End.RL.X | 11 | 1 | 6 |
| C2 | End.RL.X | 12 | 0 | 7 |
| D | End.RL.X | 0 | 0 | 8 |
| E | End.RL.X | 0 | 0 | 9 |
| F | End.RL.X | 0 | 0 | 10 |
| G | End.RL.X | 0 | 0 | 11 |
| H | End.RL.X | 0 | 0 | 12 |

| Locator | Function | Pointer | Number | SL |
|---------|----------|---------|--------|-----|
| A1 | End.RL.X | 3 | 2 | 1 |
| A2 | End.RL.X | 6 | 0 | 2 |
| B1 | End.RL.X | 8 | 3 | 3 |
| B2 | End.RL.X | 9 | 0 | 4 |
| B3 | End.RL.X | 10 | 0 | 5 |
| C1 | End.RL.X | 11 | 2 | 6 |
| C2 | End.RL.X | 12 | 0 | 7 |
| D | End.RL.X | 0 | 0 | 8 |
| E | End.RL.X | 0 | 0 | 9 |
| F | End.RL.X | 0 | 0 | 10 |
| G | End.RL.X | 0 | 0 | 11 |
| H | End.RL.X | 0 | 0 | 12 |

FIG. 6

| SID | | Address |
|-----|---------|---------|
| B1 | End.RL.X | D |
| B2 | End.RL.X | E |
| B3 | End.RL.X | F |
| C1 | End.RL.X | G |
| C2 | End.RL.X | H |

FIG. 7

| Locator | Function | Pointer | Number | SL |
|---------|----------|---------|--------|-----|
| A1 | End.RL.X | 4 | 2 | 1 |
| A2 | End.RL.X | 7 | 0 | 2 |
| A3 | End.RL.X | 9 | 0 | 3 |
| B1 | End.RL.X | 11 | 2 | 4 |
| B2 | End.RL.X | 12 | 0 | 5 |
| B3 | End.RL.X | 13 | 0 | 6 |
| C1 | End.RL.X | 14 | 1 | 7 |
| C2 | End.RL.X | 15 | 0 | 8 |
| J1 | End.RL.X | 16 | 1 | 9 |
| J2 | End.RL.X | 17 | 0 | 10 |
| D | End.RL.X | 0 | 0 | 11 |
| E | End.RL.X | 0 | 0 | 12 |
| F | End.RL.X | 0 | 0 | 13 |
| G | End.RL.X | 0 | 0 | 14 |
| H | End.RL.X | 0 | 0 | 15 |
| K | End.RL.X | 0 | 0 | 16 |
| L | End.RL.X | 0 | 0 | 17 |

| Locator | Function | Pointer | SL |
|---------|----------|---------|-----|
| A1 | End.RL.X1 | 3 | 1 |
| A2 | End.RL.X2 | 6 | 2 |
| B1 | End.RL.X1 | 8 | 3 |
| B2 | End.RL.X1 | 9 | 4 |
| B3 | End.RL.X2 | 10 | 5 |
| C1 | End.RL.X1 | 11 | 6 |
| C2 | End.RL.X2 | 12 | 7 |
| D | End.RL.X | 0 | 8 |
| E | End.RL.X | 0 | 9 |
| F | End.RL.X | 0 | 10 |
| G | End.RL.X | 0 | 11 |
| H | End.RL.X | 0 | 12 |

FIG. 10

| SID | | Address |
|-----|-----------|---------|
| B1 | End.RL.X1 | D |
| B2 | End.RL.X1 | E |
| B3 | End.RL.X2 | F |
| C1 | End.RL.X1 | G |
| C2 | End.RL.X2 | H |

FIG. 11

MULTICAST PACKET PROCESSING METHOD, RELATED APPARATUS, AND DEVICE

CROSS-REFERENCE TO RELATED APPLICATIONS

This application is a continuation of International Application No. PCT/CN2022/096544, filed on Jun. 1, 2022, which claims priority to Chinese Patent Application No. 202111134664.3, filed on Sep. 27, 2021, and Chinese Patent Application No. 202111223552.5, filed on Oct. 20, 2021. All of the aforementioned patent applications are hereby incorporated by reference in their entireties.

TECHNICAL FIELD

Embodiments of this application relate to the field of communication, and in particular, to a multicast packet processing method, a related apparatus, and a device.

BACKGROUND

A multicast technology is a point-to-multipoint transmission technology. An intermediate node replicates a packet based on a destination node of the packet. The multicast technology resolves a problem of low efficiency of unicast and broadcast, and is widely used in the field of communication.

In a multicast service processing method, a replication and forwarding relationship between a parent node and a child node is defined in a packet header. Specifically, the parent node may determine a quantity of child nodes and a location of the child node by reading information in the packet header, that is, determine a quantity of packets that need to be replicated and a next-hop node of each packet after replication, to implement transmission of a multicast packet.

There are a plurality of links between two nodes. In this method, each previous-hop node randomly selects a link to transmit a packet to a next-hop node, and the link for transmitting a multicast packet is randomly determined.

SUMMARY

Embodiments of this application provide a multicast packet processing method and apparatus, and a device. Destination information of a multicast packet not only indicates that a forwarding and replication operation is performed on a first multicast packet, but also indicates a link of each multicast packet after replication.

A first aspect of embodiments of this application provides a multicast packet processing method, where the method is applied to a first node, and the method includes:

The first node is a communication node in a multicast system, and may be a network device, for example, a device that can process a multicast packet, such as a router or a host. After obtaining a first multicast packet, the first node processes the first multicast packet based on destination information of the first multicast packet. The destination information of the first multicast packet includes a first identifier, a second identifier, and a third identifier, where the first identifier indicates link information, the second identifier indicates a replication and forwarding operation, that is, indicates that a packet type is a multicast packet, and the third identifier is used to index destination information corresponding to a second node. The first node may obtain a second multicast packet based on the first multicast packet and the third identifier, where destination information of the second multicast packet is the destination information corresponding to the second node. Then, the second multicast packet is sent to the second node based on a link indicated by the first identifier. The first node may obtain a third multicast packet based on the first multicast packet and the second identifier, and destination information of the third multicast packet is destination information corresponding to the third node. The destination information of the third node is determined based on a destination information index corresponding to a replicated multicast packet. The replicated packet is a packet obtained by replicating the first multicast packet based on the second identifier. Then, the third multicast packet is sent to the third node based on the destination information of the multicast packet that is obtained after the first multicast packet is replicated.

According to the foregoing technical solutions, it can be learned that embodiments of this application have the following advantages.

The destination information of the first multicast packet specifies a manner of processing the first multicast packet. In other words, the destination information not only indicates that a forwarding and replication operation is performed on the first multicast packet, but also indicates a link of each multicast packet after replication.

With reference to the first aspect, in a first implementation of the first aspect of embodiments of this application, the destination information of the first multicast packet further includes a fourth identifier, and the fourth identifier indicates a quantity of times of replication, or a quantity of multicast packets obtained after replication. For example, in a case that the fourth identifier indicates the quantity of times of replication, if a value of the fourth identifier is 2, the first node performs two replication operations on the first multicast packet, to obtain two replicated multicast packets, that is, a total quantity of packets obtained after replication is 3. In a case that the fourth identifier indicates the quantity of multicast packets obtained after replication, if a value of the fourth identifier is 2, the first node performs one, that is, $(2-1=1)$ replication operation on the first multicast packet, to obtain one replicated multicast packet, that is, a total quantity of packets obtained after replication is 2.

In this embodiment of this application, the fourth identifier has a plurality of meanings, and may be selected based on an actual application requirement, which improves flexibility of the technical solution, and can be applied to a plurality of scenarios.

With reference to the first aspect, in a second implementation of the first aspect of embodiments of this application, in addition to indicating the replication and forwarding operation, the second identifier may further indicate a quantity of times of replication. Specifically, whether the first multicast packet needs to be replicated is determined based on different values of the second identifier.

In this embodiment of this application, the second identifier has a plurality of meanings, and may be applicable to different packets, thereby improving usability of the technical solution.

With reference to the first aspect, or any one of the first implementation and the second implementation of the first aspect, in a third implementation of the first aspect of embodiments of this application, the destination information may be stored in a destination information list, the third identifier is a sequence number of the destination information corresponding to the second node, and the destination information corresponding to the second node can be indexed in the destination information list based on the sequence number.

With reference to the first aspect, or any one of the first implementation to the third implementation of the first aspect, in a fourth implementation of the first aspect of embodiments of this application, a process in which the first node obtains the second multicast packet specifically includes: querying the destination information list based on the third identifier, and obtaining, from the destination information list, the destination information corresponding to the second node, where the destination information corresponding to the second node is destination information corresponding to the third identifier. Then, the destination information of the first multicast packet is replaced with the destination information corresponding to the second node, to obtain the second multicast packet. The destination information corresponding to the second node can support a manner in which the second node processes the second multicast packet, including performing a replication and/or forwarding operation on the second multicast packet, transmitting a link for a processed multicast packet, and the like.

In this embodiment of this application, the third identifier reflects an association relationship between destination information corresponding to different nodes, and destination information corresponding to a next node may be determined by querying the destination information list by using the third identifier, which is simple and fast, and saves computing resources.

With reference to the first aspect, or any one of the first implementation to the fourth implementation of the first aspect, in a fifth implementation of the first aspect of embodiments of this application, a process in which the first node obtains the third multicast packet specifically includes: obtaining, by the first node through replicating the first multicast packet based on the second identifier, a replicated multicast packet. In the destination information list, destination information included in a next entry that is in the destination information list and that is of a list item matching the destination information of the first multicast packet is the destination information corresponding to the replicated multicast packet. In other words, in the destination information list, the destination information of the first multicast packet and the destination information corresponding to the multicast packet obtained after the first multicast packet is replicated are arranged together. Then, through indexing the destination information list based on the destination information corresponding to the next entry, the destination information corresponding to the third node is obtained. The destination information corresponding to the multicast packet obtained after the first multicast packet is replicated is replaced with the destination information corresponding to the third node, to obtain the third multicast packet.

In this embodiment of this application, in the destination information list, the destination information corresponding to the first multicast packet and the destination information obtained after the first multicast packet is replicated are arranged together, so that the first node can locate the corresponding destination information based on the third identifier in a process of processing the multicast packet, which is relatively friendly to a forwarding plane, and improves processing efficiency.

With reference to the first aspect, or any one of the first implementation to the fifth implementation of the first aspect, in a sixth implementation of the first aspect of embodiments of this application, the first node may be a head node in a multicast system, the first node may receive a fourth multicast packet from a multicast source, and the fourth multicast packet includes a payload that needs to be transmitted in the multicast system. Based on the destination information and the fourth multicast packet, the destination information corresponding to the first node is obtained, where the destination information corresponding to the first node includes destination information included in a first entry in the destination information list. Then, the destination information of the fourth multicast packet is determined as the destination information corresponding to the first node, to obtain the first multicast packet.

In this embodiment of this application, the first node may process the fourth multicast packet from the multicast source, to obtain the first multicast packet that needs to be processed in the multicast system, and process the first multicast packet by using the destination information corresponding to the first node, thereby ensuring smooth running of the multicast service.

With reference to the sixth implementation of the first aspect, in a seventh implementation of the first aspect of embodiments of this application, the first multicast packet may further include a plurality of pieces of sequentially arranged destination information included in the destination information list. In other words, in a case that the first node is the head node, the first node may further encapsulate the plurality of pieces of sequentially arranged destination information into the fourth multicast packet, to obtain the first multicast node.

With reference to the fourth implementation to the seventh implementation of the first aspect, in an eighth implementation of the first aspect of embodiments of this application, in addition to being encapsulated into the first multicast packet, the plurality of pieces of sequentially arranged destination information included in the destination information list may be further stored locally on the first node.

In this embodiment of this application, the plurality of pieces of sequentially arranged destination information included in the destination information list may be stored in different locations. If the plurality of pieces of sequentially arranged destination information are stored in the first multicast packet, transmission of the multicast packet is simpler. If the plurality of pieces of sequentially arranged destination information are stored locally on the node, overheads of a packet header in the multicast packet can be reduced, and an amount of data to be transmitted in the multicast packet can be increased.

With reference to any one of the fourth implementation to the eighth implementation of the first aspect, in a ninth implementation of the first aspect of embodiments of this application, the destination information list is a segment identifier list (SID list) included in the first multicast packet, a SID list configured by the first node, or the destination information list is a correspondence list configured by the first node, and the correspondence list reflects a correspondence between identifiers included in the destination information.

In this embodiment of this application, there are a plurality of possibilities for content included in the destination information list, and the content may be determined based on an actual application requirement, thereby improving flexibility of the technical solution.

With reference to the first aspect, or any one of the first implementation to the ninth implementation of the first aspect, in a tenth implementation of the first aspect of embodiments of this application, if the first multicast packet is a segment routing over internet protocol version 6 (segment routing over IPv6, SRv6) packet, the first identifier is included in a locator field of the SRv6 packet, the second identifier is included in a function field of the SRv6 packet, and the third identifier is included in an argument field of the SRv6 packet.

With reference to any one of the first implementation to the ninth implementation of the first aspect, in an eleventh implementation of the first aspect of embodiments of this application, if the first multicast packet is a segment routing over internet protocol version 6 (SRv6) packet, the first identifier is included in a locator field of the SRv6 packet, the second identifier is included in a function field of the SRv6 packet, and the third identifier and the fourth identifier are included in an argument field of the SRv6 packet.

In this embodiment of this application, when the multicast packet is an SRv6 packet, there are a plurality of cases in which fields included in identifiers corresponding to the multicast packet may be selected based on an actual application requirement, thereby further improving flexibility of the technical solution.

A second aspect of embodiments of this application provides a multicast packet processing method, where the method is applied to a management node, and the method includes:

obtaining a transmission requirement of a first multicast packet and attribute information of each communication link in the multicast system, and determining transmission link information of the first multicast packet based on the transmission requirement and the attribute information, where the transmission link information indicates a link set used for transmitting the first multicast packet in the multicast system, and the link set meets the transmission requirement. Then, the communication link set is encoded to obtain a destination information list. The destination information list includes destination information corresponding to the first multicast packet, and the destination information of the first multicast packet includes a first identifier that indicates link information, a second identifier that indicates a replication and forwarding operation, and a third identifier used to index destination information corresponding to a second node.

In this embodiment of this application, the destination information included in the first multicast packet specifies a manner of processing the first multicast packet. In other words, the destination information not only indicates that a forwarding and replication operation is performed on the first multicast packet, but also indicates a communication link of each multicast packet after replication.

In some optional embodiments, if a management node is not a node in the multicast system, after determining the destination information list, the management node may send the destination information list to a head node in the multicast system. The node in the multicast system refers to a node that can perform a replication and forwarding operation on a multicast packet and that is in a multicast tree.

In some optional embodiments, the transmission requirement of the multicast packet includes at least one of a transmission delay requirement of the multicast packet, a transmission bandwidth requirement, and a requirement (for example, passing through a node/link or excluding a node/link) set by a multicast source.

In some optional embodiments, the attribute information of each link includes information that reflects a network performance indicator, such as a delay and a bandwidth of each link. This is not specifically limited herein.

In some optional embodiments, if the management node is the head node in the multicast system, the management node may further perform the method in the first aspect. Details are not described herein again.

A third aspect of embodiments of this application provides a multicast packet processing apparatus, including an obtaining unit and a sending unit. The obtaining unit is configured to:

obtain a first multicast packet, where destination information of the first multicast packet includes a first identifier, a second identifier, and a third identifier, the first identifier indicates link information, the second identifier indicates a replication and forwarding operation, and the third identifier is used to index destination information corresponding to a second node;

obtain a second multicast packet based on the first multicast packet and the third identifier, where destination information of the second multicast packet is the destination information corresponding to the second node; and obtain a third multicast packet based on the first multicast packet and the second identifier, where destination information of the third multicast packet is destination information corresponding to a third node that is determined based on a destination information index corresponding to a multicast packet obtained after the first multicast packet is replicated.

The sending unit is configured to send the second multicast packet to the second node based on a link indicated by the first identifier; and send the third multicast packet to the third node based on a link indicated by the destination information of the multicast packet that is obtained after the first multicast packet is replicated.

The multicast packet processing apparatus is configured to perform the method in the first aspect. Details are not described herein again.

A fourth aspect of embodiments of this application provides a multicast packet processing apparatus, including:

an obtaining unit, configured to obtain a transmission requirement of a first multicast packet and attribute information of communication links in a multicast system; and a processing unit, configured to determine transmission link information of the first multicast packet based on the transmission requirement and the attribute information, where the transmission link information indicates a link set used for transmitting the first multicast packet in the multicast system.

The communication link set is encoded to obtain a destination information list. The destination information list includes destination information corresponding to the first multicast packet, and the destination information of the first multicast packet includes a first identifier that indicates link information, a second identifier that indicates a replication and forwarding operation, and a third identifier used to index destination information corresponding to a second node.

The multicast packet processing apparatus is configured to perform the method in the second aspect. Details are not described herein again.

A fifth aspect of embodiments of this application provides a network device, including a processor, a memory, and a communication interface. The processor and the memory are connected to the communication interface, and the processor is configured to perform the method in the first aspect or the second aspect.

A sixth aspect of embodiments of this application provides a computer-readable storage medium, where the computer-readable storage medium stores a program, and when a computer executes the program, the method in the first aspect or the second aspect is performed.

A seventh aspect of embodiments of this application provides a computer program product. When the computer program product is executed on a computer, the computer performs the method in the first aspect or the second aspect.

Beneficial effects shown in the second aspect to the seventh aspect are similar to those in the first aspect or the second aspect, and details are not described herein again.

BRIEF DESCRIPTION OF DRAWINGS

FIG. 1 is a schematic diagram of an application architecture of a multicast packet transmission method according to an embodiment of this application;

FIG. 2 is a schematic flowchart of a multicast packet transmission method according to an embodiment of this application;

FIG. 3A is a schematic diagram of a format of an SRv6 packet according to an embodiment of this application;

FIG. 3B is a schematic diagram of a format of a multicast packet according to an embodiment of this application;

FIG. 6 is another schematic diagram of a destination information list according to an embodiment of this application;

FIG. 7 is a schematic diagram of an address mapping relationship between destination information and a leaf node according to an embodiment of this application;

FIG. 10 is another schematic diagram of a destination information list according to an embodiment of this application;

FIG. 11 is another schematic diagram of an address mapping relationship between destination information and a leaf node according to an embodiment of this application;

DESCRIPTION OF EMBODIMENTS

Figures 4, 5:
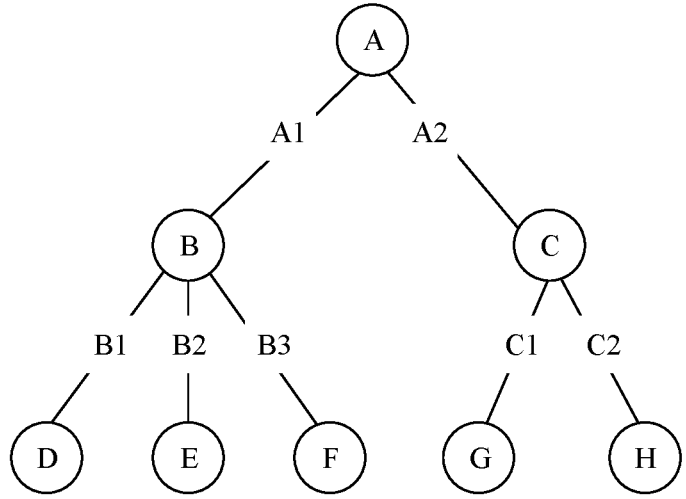
FIG. 4 is a schematic diagram of a multicast tree according to an embodiment of this application.
FIG. 5 is a schematic diagram of a destination information list according to an embodiment of this application.

Embodiments of this application provide a multicast packet processing method, a related apparatus, and a device. Destination information of a multicast packet not only indicates that a forwarding and replication operation is performed on a first multicast packet, but also indicates a link of each multicast packet after replication.

First, a multicast system is briefly described. FIG. 1 is a schematic diagram of an application architecture of a multicast packet transmission method according to an embodiment of this application.

As shown in FIG. 1, the multicast system includes a node 1 to a node 8. A structure formed by connecting the node 1 to the node 8 shown in FIG. 1 may be considered as a multicast tree, and the multicast tree reflects nodes and links that a multicast packet passes through in the multicast system. A head node in the multicast tree may also be referred to as an ingress node or a source node, for example, the node 1 in FIG. 1. An egress node in the multicast tree may also be referred to as a leaf node, for example, the node 4 to the node 8. An intermediate node in the multicast tree replicates and forwards the multicast packet, and transmits the multicast packet from the ingress node to the leaf node. For example, the node 2 and the node 3 in FIG. 1 are intermediate nodes.

For example, the node 2 is used as an example to describe a multicast packet replication and forwarding process. In the embodiment shown in FIG. 1, after receiving a multicast packet from the node 1, and querying destination information of the multicast packet, the node 2 replicates the multicast packet into three copies, and separately sends one multicast packet to the node 4 to the node 6.

It should be noted that, in an actual application, the node 1 to the node 8 may be network devices. There are a plurality of possible types of network devices, and the network devices may be hosts, routers, or other devices that can process multicast packets. This is not specifically limited herein. The head node and the leaf node may also be network edge nodes.

Optionally, if the node 1 serving as a source node in the multicast system undertakes a path computation function, the node 1 may obtain a transmission requirement of a multicast packet and attribute information of each link in the multicast system, and then determine, based on the multicast requirement and the attribute information, a multicast tree that meets the multicast requirement.

Optionally, as shown in FIG. 1, the application architecture may further include a management node. The management node may obtain a multicast requirement, that is, a transmission requirement of a multicast packet, and attribute information of each link in a multicast system, and then determine, based on the multicast requirement and the attribute information, a multicast tree that meets the multicast requirement. Then, the multicast tree is encoded based on an encoding manner defined in the multicast packet, and an encoding result is inserted into a packet header of the multicast packet, so that the network node forwards the multicast packet based on the determined multicast tree, thereby achieving an objective of explicitly specifying a multicast packet link.

FIG. 2 is a schematic flowchart of a multicast packet transmission method according to an embodiment of this application. The method is applied to a first node, and the method includes the following steps.

201. Obtain a first multicast packet, where destination information of the first multicast packet includes a first identifier, a second identifier, and a third identifier, the first identifier indicates link information, the second identifier indicates a replication and forwarding operation, and the third identifier is used to index destination information corresponding to a second node.

There are a plurality of possible manners in which the first node obtains the multicast packet, and the following separately describes the manners.

In some optional embodiments, in a case that the first node is the head node in the multicast tree, the first node may receive the first multicast packet sent by another node outside the multicast tree. Alternatively, the first node may obtain the first multicast packet based on a destination information list and a fourth multicast packet from a multicast source. Specifically, the first node may obtain the destination information corresponding to the first node from the destination information list, where the destination information corresponding to the first node includes the destination information included in a first entry in the destination information list. Then, the destination information corresponding to the first node is inserted into the fourth multicast packet, to obtain the first multicast packet.

In this embodiment of this application, the first node may process the fourth multicast packet from the multicast source, to obtain the first multicast packet that needs to be processed in the multicast system, and process the first multicast packet by using the destination information corresponding to the first node, thereby ensuring smooth running of the multicast service.

In some optional embodiments, if the first node is an intermediate node in the multicast tree, the first node may receive a first multicast packet from a parent node of the intermediate node from the multicast tree.

In some optional embodiments, the first multicast packet further includes a plurality of pieces of sequentially arranged destination information included in the destination information list. The plurality of pieces of sequentially arranged destination information included in the destination information list are stored in the first multicast packet, so that transmission of the multicast packet is simpler. Optionally, the destination information list may be further stored locally on the first node, to reduce packet header overheads of the multicast packet. A storage manner of the destination information list is determined based on an actual application requirement, and is not specifically limited herein.

202. Obtain a second multicast packet based on the first multicast packet and the third identifier, where destination information of the second multicast packet is the destination information corresponding to the second node.

The first node may obtain the second multicast packet based on the first multicast packet and the third identifier. Specifically, the third identifier may be a sequence number of the destination information corresponding to the second node, and the sequence number is used for indexing in the destination information list. The first node queries the destination information list based on the third identifier, and obtains the destination information corresponding to the second node. The destination information list includes a plurality of pieces of sequentially arranged destination information. In the destination information list, destination information corresponding to the third identifier is the destination information corresponding to the second node.

After obtaining the destination information of the second node, the first node replaces the destination information corresponding to the second node with the destination information of the first multicast packet, to obtain the second multicast packet. In other words, payload of the first multicast packet is the same as payload of the second multicast packet, but the destination information is different. It may be understood that, similar to the destination information of the first multicast packet, the destination information corresponding to the second node may also include three identifiers, which respectively indicate link information, indicate a replication and forwarding operation, and index destination information corresponding to a next-hop node of the second node. Details are not described herein again.

In this embodiment of this application, the third identifier reflects an association relationship between destination information corresponding to different nodes, and destination information corresponding to a next node may be determined by querying the destination information list by using the third identifier, which is simple and fast, and saves computing resources.

203. Obtain a third multicast packet based on the first multicast packet and the second identifier, where destination information of the third multicast packet is destination information corresponding to a third node that is determined based on a destination information index corresponding to a multicast packet obtained after the first multicast packet is replicated.

In some optional embodiments, in addition to indicating the replication and forwarding operation, the second identifier may further indicate a quantity of times of replication of the multicast packet. In this case, the first node replicates the first multicast packet based on the second identifier, to obtain a replicated multicast packet.

In some optional embodiments, the destination information of the first multicast packet further includes a fourth identifier, and the fourth identifier indicates the quantity of times of replication of the multicast packet or a quantity of copies of the replicated multicast packet. In this case, the first node replicates the first multicast packet based on the second identifier and the fourth identifier, to obtain a replicated multicast packet.

Optionally, in a case that the fourth multicast identifier indicates the quantity of times of replication of the multicast packet, if a value of the fourth identifier is 3, it indicates that the first multicast packet needs to be replicated three times, to obtain three replicated multicast packets, that is, a total quantity of packets obtained after replication is 4.

Optionally, the fourth multicast identifier indicates the quantity of copies of the multicast packet. If a value of the fourth identifier is 3, it indicates that the first multicast packet needs to be replicated 3−1=2 times, to obtain two replicated multicast packets, that is, a total quantity of packets obtained after replication is 3.

The first node may further process the replicated multicast packet based on the destination information list, to obtain the third multicast packet. If there is one replicated multicast packet, the first node obtains, from the destination information list, destination information that is included in a next entry and that is of a list item matching the destination information of the first multicast packet. Destination information corresponding to the replicated multicast packet is the destination information included in the next entry. Similar to the destination information of the first multicast packet, the destination information included in the next entry in the destination information list also includes an identifier that indicates link information, an identifier that indicates a replication and forwarding operation, and an identifier used to index destination information corresponding to the second node. In some optional embodiments, the destination information included in the next entry may further include an identifier that indicates a quantity of times of replication or a quantity of multicast packets obtained after replication. Details are not described herein again. Therefore, the first node may index the destination information corresponding to the third node based on the destination information included in the next entry. The destination information of the replicated multicast packet is replaced with the destination information corresponding to the third node, to obtain the third multicast packet.

If a quantity of replicated multicast packets is N (N≥2, and N is an integer), the first node obtains, from the destination information list, the destination information that is included in the next N entries and that is of the item list that matching the destination information of the first multicast packet. The destination information corresponding to a plurality of nodes is indexed based on the destination information included in the next N entries. The destination information of each replicated multicast packet is replaced with destination information corresponding to a node in the plurality of nodes, to obtain N multicast packets with different destination information. A multicast packet whose destination information is the destination information corresponding to the third node is the third multicast packet.

In this embodiment of this application, the destination information list includes a plurality of pieces of sequentially arranged destination information. Similar to the destination information of the first multicast packet, each piece of destination information in the destination information list may include an identifier that indicates link information, an identifier that indicates a replication and forwarding operation, and an identifier used to index destination information corresponding to a next-hop node. In some optional embodiments, each piece of destination information in the destination information list may further include an identifier that indicates a quantity of times of replication or a quantity of multicast packets obtained after replication. Details are not described herein. In the destination information list, a plurality of pieces of destination information corresponding to a same node are arranged together.

204. Send the second multicast packet to the second node based on a link indicated by the first identifier.

After the second multicast packet is obtained, the first node sends the second multicast packet to the second node based on the link indicated by the first identifier. The link indicated by the first identifier is a link that connects the first node to the second node.

205. Send the third multicast packet to the third node based on a link indicated by destination information of the multicast packet that is obtained after the first multicast packet is replicated.

After the third multicast packet is obtained, the first node sends the third multicast packet to the third node based on the link indicated by the destination information of the multicast packet that is obtained after the first multicast packet is replicated.

In some optional embodiments, the destination information list is a SID list included in the first multicast packet, a SID list configured by the first node, or a correspondence list configured by the first node.

In some optional embodiments, if the first multicast packet is an SRv6 packet, the first identifier is included in a locator field of the SRv6 packet, the second identifier is included in a function field of the SRv6 packet, and the third identifier is included in an argument field of the SRv6 packet.

In some optional embodiments, if the first multicast packet is an SRv6 packet, the first identifier is included in a locator field of the SRv6 packet, the second identifier is included in a function field of the SRv6 packet, and both the third identifier and the fourth identifier are included in an argument field of the SRv6 packet.

The multicast packet transmission method provided in this embodiment of this application is not limited to being applied to an internet protocol version 6 (IPv6) network, and may also be applied to another network such as an IP layer, an application layer, or a transport layer. Similarly, a format of the multicast packet is not limited to an SRv6 packet, and may be a packet in another format in another network. This is not specifically limited herein.

An embodiment of this application further provides a multicast packet processing method applied to a management node. The method includes:

obtaining a transmission requirement of a first multicast packet and attribute information of each communication link in the multicast system, and determining transmission link information of the first multicast packet based on the transmission requirement and the attribute information, where the transmission link information indicates a link set used for transmitting the first multicast packet in the multicast system, and the link set meets the transmission requirement. Then, the communication link set is encoded to obtain a destination information list. The destination information list includes destination information corresponding to the first multicast packet, and the destination information of the first multicast packet includes a first identifier that indicates link information, a second identifier that indicates a replication and forwarding operation, and a third identifier used to index destination information corresponding to a second node.

In some optional embodiments, if a management node is not a node in the multicast system, after determining the destination information list, the management node may send the destination information list to a head node in the multicast system. The node in the multicast system refers to a node that can perform a replication and forwarding operation on a multicast packet and that is in a multicast tree.

In some optional embodiments, the transmission requirement of the multicast packet includes at least one of a transmission delay requirement of the multicast packet, a transmission bandwidth requirement, and a requirement (for example, passing through a node/link or excluding a node/link) set by a multicast source.

In some optional embodiments, the attribute information of each link includes information that reflects a network performance indicator, such as a delay and a bandwidth of each link. This is not specifically limited herein.

In some optional embodiments, if the management node is the head node in the multicast system, the management node may further perform the method in the first aspect. Details are not described herein again.

The following describes the multicast packet processing method provided in this embodiment of this application by using an example in which the first multicast packet is an SRv6 packet and the destination information list is located in a packet header of the SRv6 packet. FIG. 3A is a schematic diagram of a format of an SRv6 packet according to an embodiment of this application, and FIG. 3B is a schematic diagram of a format of a multicast packet according to an embodiment of this application.

According to the multicast packet processing method provided in this embodiment of this application, a basic format of an SRv6 packet is retained, that is, the multicast packet still includes an IPv6 packet header, a segment routing header, and payload. Different from a conventional SRv6 packet, in the SRv6 multicast packet provided in this embodiment of this application, a segment routing header (SRH) of the SRv6 packet is newly defined, and is referred to as a multicast routing header (MRH). In other words, in this embodiment of this application, the packet header of the multicast packet includes the IPv6 packet header and the MRH.

The MRH is similar to the SRH, and the MRH may also hit, by using a value of an SL (segment left), a segment identifier (SID) corresponding to a segment in the segment list.

In this embodiment of this application, a segment list is placed in "Type-specific Data" shown in FIG. 3B. Each segment in the segment list is used to represent a communication link (adjacency) or a node on an explicit path.

It may be understood that the segment list may be referred to as a SID list, each SID in the SID list is represented as a 128-bit IPv6 address, and the SID list is represented as a group of ordered IPv6 address lists inserted into the MRH, that is, the destination information list provided in this embodiment of this application.

In the embodiment shown in FIG. 3B, the destination information in the IPv6 packet header is stored in a Destination Address field, and corresponds to an item in the destination information list.

On an IPv6 network, SID flooding is performed on a control plane. Based on a network node on a multicast source routing over IPv6 (MSR) link, the SID corresponding to the multicast packet is flooded through the Interior Gateway Protocol (IGP) or other protocols. The SID includes a locator field, a function field, and an argument field. The multicast packet is replicated and forwarded by defining fields.

On the control plane, the management node or the head node that undertakes a path computation function may obtain a transmission requirement of the multicast packet and attribute information of each communication link in the multicast system, and determine, based on the transmission requirement and the attribute information, transmission link information (that is, a multicast tree) that meets the transmission requirement. The transmission link information includes a link set used for transmitting the first multicast packet in the multicast system. Then, the transmission link information is encoded into the SID list in the packet header based on the MRH encoding mode to obtain the MRH, so that each link indicated in the multicast explicit path uses a corresponding segment. A value of the argument corresponding to the segment is determined by a quantity of packets replicated by the segment and the location of an associated sub-segment.

Optionally, the management node header and the head node may further perform the foregoing process by division of work. For example, the management node determines the multicast tree, and delivers the multicast tree to the head node, and the head node encodes the multicast tree into the SID list of the packet header, so as to complete the mapping from the multicast tree to the SID list. Alternatively, the management node may implement an entire encoding process, and then deliver the MRH obtained through encoding to the head node, and the head node does not need to perform multicast tree calculation, so as to save computing resources of the head node. This may be specifically determined based on an actual application requirement, and is not limited herein.

On a data plane, after obtaining the MRH, the head node encapsulates the MRH into the packet header. The head node and the intermediate node process the multicast packet based on the destination information indicated by the MRH. After receiving the multicast packet, a leaf node decapsulates the multicast packet or uplink processes the multicast packet.

The following uses the multicast tree shown in FIG. 4 as an example to describe in detail a processing process of the foregoing multicast packet. FIG. 4 is a schematic diagram of a multicast tree according to an embodiment of this application.

It is assumed that a transmission path of the multicast packet is determined based on a transmission requirement of the multicast packet and attribute information of each link in the multicast system, as shown in FIG. 4. A head node A is used as an example. The head node A receives the first multicast packet, and processes the first multicast packet based on the destination information of the first multicast packet, to obtain the second multicast packet and the third multicast packet. The second multicast packet is sent to a node B based on a link A1, and the third multicast packet is sent to a node C based on a link A2.

In this embodiment of this application, there are a plurality of cases in which the destination information includes the identifier. The following separately describes the possible cases.

1. The Destination Information Includes a First Identifier, a Second Identifier, a Third Identifier, and a Fourth Identifier In this case, the first identifier is included in a locator field of the SRv6 packet, and indicates link information; the second identifier is included in a function field of the SRv6 packet, and indicates a replication and forwarding operation; both the third identifier and the fourth identifier are included in an argument field of the SRv6; the third identifier is used to index destination information corresponding to a next-hop node; and the fourth identifier indicates a quantity of times of replication or a quantity of copies of replicated packets.

Based on the multicast tree shown in FIG. 4, a schematic diagram of a destination information list may be shown in FIG. 5. In the embodiment shown in FIG. 5, the first identifier is represented as a value of a locator field, and is an IPv6 address; the second identifier is represented as a Function field, and End.RL.X indicates that a type of the packet is a multicast packet; the third identifier is represented as a value of a Pointer in an Argument field; and the fourth identifier is represented as a value of a Number in the Argument field, and the fourth identifier indicates a quantity of times of replication of the multicast packet. The "Number" can also be written as "Replication Number".

In the embodiment shown in FIG. 5, the node A receives the first multicast packet, and the destination information of the first multicast packet is a SID corresponding to SL=1, and is a local SID of the node A, and the entry 1 in FIG. 5 is hit. The node A replicates the first multicast packet once based on Number=1, to obtain a replicated multicast packet. Then, the first multicast packet and the replicated multicast packet are processed as follows:

The destination information of the first multicast packet is replaced, based on the third identifier, with destination information corresponding to SL=Pointer=3, that is, destination information corresponding to the node B, to obtain the second multicast packet. In addition, the second multicast packet is sent to the node B based on the link A1 indicated by a first identifier Locator (that is, a locator in the entry 1) included in the destination information corresponding to the first multicast packet.

The destination information of the first multicast packet is replaced with destination information that is included in a next entry and that is of the item list matching the destination information of the first multicast packet in the destination information list, that is, the destination information corresponding to SL=SL(current)+1=2 in the embodiment shown in FIG. 5, to obtain the replicated multicast packet. Because SL=2 in this case, an entry 2 in FIG. 5 is hit. Based on the destination information corresponding to the entry 2, the destination information of the replicated multicast packet is replaced with the destination information corresponding to SL=Pointer=6, to obtain the third multicast packet. In addition, the SL is also set to the value 6 of the Pointer. The third multicast packet is sent to the node C based on the destination information of the replicated multicast packet, that is, the link A2 indicated by the first identifier Locator included in the destination information corresponding to the entry 2. That is, the link of the third multicast packet is determined based on the destination information corresponding to the packet obtained after replication.

The node B receives the second multicast packet, where destination information of the second multicast packet is a SID corresponding to SL=3, and is a local SID of the node B, and an entry 3 in FIG. 5 is hit. The node B replicates the multicast packet twice based on Number=2, to obtain two replicated multicast packets (a first replicated packet and a second replicated packet). Then, the second multicast packet, the first replicated packet, and the second replicated packet are processed as follows:

The destination information of the third multicast packet is replaced, based on the third identifier of the second multicast packet, with destination information corresponding to SL=Pointer=8, that is, destination information corresponding to a node D, to obtain a fifth multicast packet. In addition, the fifth multicast packet is sent to the node D based on the link B1 indicated by a first identifier Locator (that is, a locator in the entry 3) included in the destination information corresponding to the second multicast packet.

The destination information of the first replicated packet is destination information included in a next entry that is in the destination information list and that is of the list item matching the destination information of the second multicast packet in the destination information list, that is, destination information corresponding to SL=SL(current)+1=4 in the embodiment shown in FIG. 5, and an entry 4 in FIG. 5 is hit. Based on the destination information corresponding to the entry 4, the destination information of the first replicated packet is replaced with the destination information corresponding to SL=Pointer=9, to obtain a sixth multicast packet. In addition, the SL is also set to the value 9 of the Pointer. In addition, the sixth multicast packet is sent to a node E based on a link B2 indicated by a Locator (that is, a locator in the entry 4) included in the destination information corresponding to the first replicated packet.

The destination information of the second replicated packet is destination information included in a second entry next the item list that matches the destination information of the second multicast packet in the destination information list, that is, destination information corresponding to SL=SL(current)+2=5 in the embodiment shown in FIG. 5, and an entry 5 in FIG. 5 is hit. Based on the destination information corresponding to the entry 5, the destination information of the second replicated packet is replaced with destination information corresponding to SL=Pointer=10, to obtain a seventh multicast packet. In addition, the SL is also set to the value 10 of the Pointer. In addition, the seventh multicast packet is sent to a node F based on a link B3 indicated by a Locator (that is, a locator in the entry 5) included in the destination information corresponding to the second replicated packet.

A process in which the node C processes the third multicast packet is similar to a process in which the node B processes the second multicast packet, and details are not described herein again.

In some optional embodiments, the fourth identifier may indicate a quantity of multicast packets obtained after replication. For example, based on the multicast tree shown in FIG. 4, the destination information list may also be shown in FIG. 6. In the embodiment shown in FIG. 6, "Number=2" in the first entry indicates that two multicast packets are replicated, that is, after the node A replicates the first multicast packet, one replicated packet is obtained. In this case, there are two multicast packets in total. A value and a definition manner of the fourth identifier are determined based on an actual application requirement, and are not specifically limited herein.

Optionally, in this embodiment of this application, in a packet header of the multicast packet, a last-hop segment may be specified, or a last-hop segment may not be specified. This is determined based on an actual application requirement. This is not specifically limited herein. For example, in the embodiment shown in FIG. 5 or FIG. 6, based on the multicast tree shown in FIG. 4, a leaf node is specified in a packet header of a multicast packet, that is, a last hop is specified. If the last hop is not specified in the packet header of the multicast packet based on the multicast tree shown in FIG. 4, that is, related information of the last hop is not encoded in the MRH when the SID list is encoded, the node needs to locally maintain the address mapping relationship between the destination information and the leaf node shown in FIG. 7. This mode not only saves the overhead of the packet header, but also ensures the smooth transmission of the multicast packet.

In some optional embodiments, after receiving the multicast packet, the head node may obtain more than two multicast packets through replication. The following describes this case. For example, the multicast tree shown in FIG. 8 is used as an example to describe this case.

Figures 8, 9:
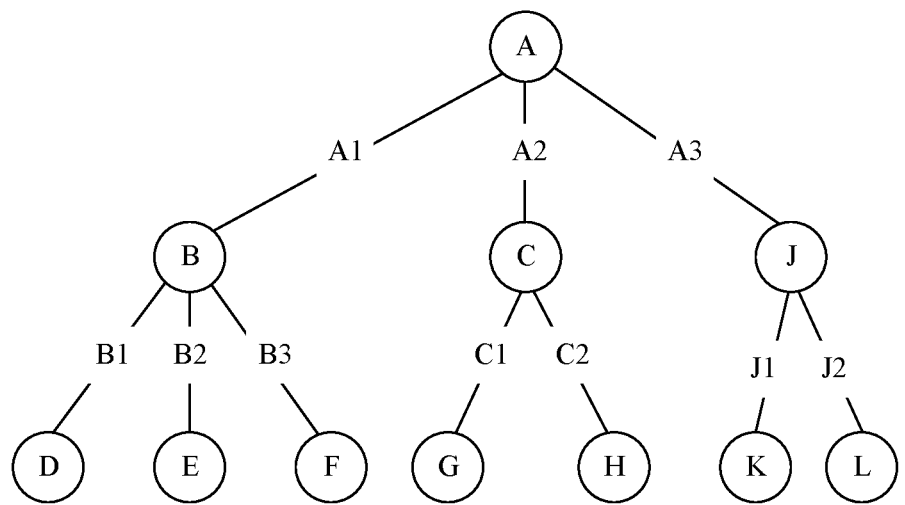
FIG. 8 is another schematic diagram of a multicast tree according to an embodiment of this application.
FIG. 9 is another schematic diagram of a destination information list according to an embodiment of this application.

Based on the multicast tree shown in FIG. 8, a schematic diagram of a destination information list may be shown in FIG. 9. In the embodiment shown in FIG. 9, the first identifier is represented as a value of a locator field, and is an IPv6 address; the second identifier is represented as a Function field, and End.RL.X indicates that a type of the packet is a multicast packet; the third identifier is represented as a value of a Pointer in an Argument field; and the fourth identifier is represented as a value of a Number in the Argument field, and the fourth identifier indicates a quantity of times of replication of the multicast packet. The "Number" can also be written as "Replication Number".

In the embodiment shown in FIG. 9, the node A receives the first multicast packet, and the destination information of the first multicast packet is a SID corresponding to SL=1, and is a local SID of the node A, and the entry 1 in FIG. 9 is hit. The node A replicates the multicast packet twice based on Number=2, to obtain two replicated multicast packets (a third replicated packet and a fourth replicated packet). Then, the first multicast packet, the third replicated packet, and the fourth replicated packet are processed as follows:

The destination information of the first multicast packet is replaced, based on the third identifier, with destination information corresponding to SL=Pointer=4, that is, destination information corresponding to the node B, to obtain the second multicast packet. In addition, the second multicast packet is sent to the node B based on the link A1 indicated by a first identifier Locator (that is, a locator in the entry 1) included in the destination information corresponding to the first multicast packet.

The destination information of the third replicated packet is destination information included in a next entry of the item list that matches the destination information of the first multicast packet in the destination information list, that is, destination information corresponding to SL=SL(current)+1=2, in the embodiment shown in FIG. 8, and an entry 2 in FIG. 8 is hit. Based on the destination information corresponding to the entry 2, the destination information of the replicated packet is replaced with the destination information corresponding to SL=Pointer=7, to obtain an eighth multicast packet. In addition, the SL is also set to the value 7 of the Pointer. In addition, the eighth multicast packet is sent to a node C based on a link A2 indicated by a Locator (that is, a locator in the entry 2) included in the destination information corresponding to the third replicated packet.

The destination information of the fourth replicated packet is destination information included in a second entry next the item list that matches the destination information of the second multicast packet in the destination information list, that is, destination information corresponding to SL=SL (current)+2=3 in the embodiment shown in FIG. 8, and an entry 3 in FIG. 8 is hit. Based on the destination information corresponding to the entry 3, the destination information of the second replicated packet is replaced with the destination information corresponding to SL=Pointer=9, to obtain an eighth multicast packet. In addition, the SL is also set to the value 9 of the Pointer, a ninth multicast packet is sent to a node J based on a link A3 indicated by a Locator (that is, a locator in the entry 3) included in the destination information corresponding to the third replicated packet.

A process in which the node B processes the second multicast packet, a process in which the node C processes the eighth multicast packet, and a process in which the node J processes the ninth multicast packet are similar to a process in which the node A processes the first multicast packet. Details are not described herein again.

2. The Destination Information Includes a First Identifier, a Second Identifier, and a Fourth Identifier In this case, the first identifier is included in a locator field of the SRv6 packet, and indicates link information; the second identifier is included in a function field of the SRv6 packet, and indicates a replication and forwarding operation and a quantity of times of replication; and the third identifier is included in an argument field of the SRv6, and is used to index destination information corresponding to a next-hop node.

Based on the multicast tree shown in FIG. 4, a schematic diagram of a destination information list may be shown in FIG. 10. In the embodiment shown in FIG. 10, the first identifier is represented as a value of a locator field, and is an IPv6 address; the second identifier is represented as a function field, End.RL.X1 indicates that the multicast packet is replicated once, and End.RL.X2 indicates that the multicast packet is replicated zero times, that is, the multicast packet is not replicated.

In the embodiment shown in FIG. 10, the node A receives the first multicast packet, and the destination information of the first multicast packet is a SID corresponding to SL=1, and is a local SID of the node A, and the entry 1 in FIG. 10 is hit. The node A replicates the first multicast packet once based on an instruction of the second identifier End.RL.X1, to obtain a fifth replicated packet. Then, the first multicast packet and the fifth replicated packet are processed as follows:

The destination information of the first multicast packet is replaced, based on the third identifier, with destination information corresponding to SL=Pointer=3, that is, destination information corresponding to the node B, to obtain the second multicast packet. In addition, the second multicast packet is sent to the node B based on the link A1 indicated by a first identifier Locator (that is, a locator in the entry 1) included in the destination information corresponding to the first multicast packet.

The destination information of the fifth replicated packet is destination information included in a next entry of the item list that matches the destination information of the first multicast packet in the destination information list, that is, destination information corresponding to SL=SL(current)+

1=2 in the embodiment shown in FIG. 10, and an entry 2 in FIG. 10 is hit. The fifth replicated packet is processed based on the destination information corresponding to the entry 2. Specifically, the second identifier corresponding to the entry 2 is End.RL.X2, and the node A does not need to replicate the fifth replicated packet, and replaces the destination information of the fifth replicated packet with destination information corresponding to SL=Pointer=6, to obtain the third multicast packet. The third multicast packet is sent to the node C based on a link A2 indicated by the first identifier Locator (that is, the locator in the entry 2) included in the destination information corresponding to the fifth replicated packet.

The node B receives the second multicast packet, where destination information of the second multicast packet is a SID corresponding to SL=3, and is a local SID of the node B, and an entry 3 in FIG. 10 is hit. The node B replicates the second multicast packet once based on an instruction of the second identifier End.RL.X1, to obtain a sixth replicated packet. Then, the second multicast packet and the sixth replicated packet are processed as follows:

The destination information of the second multicast packet is replaced, based on the third identifier, with destination information corresponding to SL=Pointer=8, that is, destination information corresponding to the node D, to obtain a tenth multicast packet. In addition, the tenth multicast packet is sent to the node D based on the link B1 indicated by a first identifier Locator (that is, a locator in the entry 3) included in the destination information corresponding to the second multicast packet.

The destination information of the sixth replicated packet is destination information included in a next entry of the item list that matches the destination information of the second multicast packet in the destination information list, that is, destination information corresponding to SL=SL (current)+1=4 in the embodiment shown in FIG. 10, and an entry 4 in FIG. 10 is hit. The sixth replicated packet is processed based on the destination information corresponding to the entry 4. Specifically, the second identifier corresponding to the entry 4 is End.RL.X1, and the node B replicates the sixth replicated packet once to obtain a seventh replicated packet. The destination information of the sixth replicated packet is replaced with destination information corresponding to SL=Pointer=9, to obtain an eleventh multicast packet. The eleventh multicast packet is sent to the node E based on a link B2 indicated by the first identifier Locator (that is, the locator in the entry 4) included in the destination information corresponding to the sixth replicated packet.

The destination information of the seventh replicated packet is destination information included in a second entry next the item list that matches the destination information of the second multicast packet in the destination information list, that is, destination information corresponding to SL=SL (current)+2=5 in the embodiment shown in FIG. 10, and an entry 5 in FIG. 10 is hit. The seventh replicated packet is processed based on the destination information corresponding to the entry 5. Specifically, the second identifier corresponding to the entry 5 is End.RL.X2, and the node B does not need to replicate the seventh replicated packet, and replaces the destination information of the seventh replicated packet with destination information corresponding to SL=Pointer=10, to obtain a twelfth multicast packet. The twelfth multicast packet is sent to the node F based on a link B3 indicated by the first identifier Locator (that is, the locator in the entry 5) included in the destination information corresponding to the seventh replicated packet.

A process in which the node C processes the third multicast packet is similar to a process in which the node B processes the second multicast packet, and details are not described herein again.

Optionally, in this embodiment of this application, in a case that the destination information includes the first identifier, the second identifier, and the third identifier, in the packet header of the multicast packet, a last-hop segment may be specified, or a last-hop segment may not be specified. This is determined based on an actual application requirement. This is not specifically limited herein. For example, in the embodiment shown in FIG. 10, based on the multicast tree shown in FIG. 4, a leaf node is specified in a packet header of a multicast packet, that is, a last hop is specified. If the last hop is not specified in the packet header of the multicast packet based on the multicast tree shown in FIG. 4, that is, related information of the last hop is not encoded in the MRH when the SID list is encoded, the node needs to locally maintain the address mapping relationship between the destination information and the leaf node shown in FIG. 11. This mode not only saves the overhead of the packet header, but also ensures the smooth transmission of the multicast packet.

Figure 12:
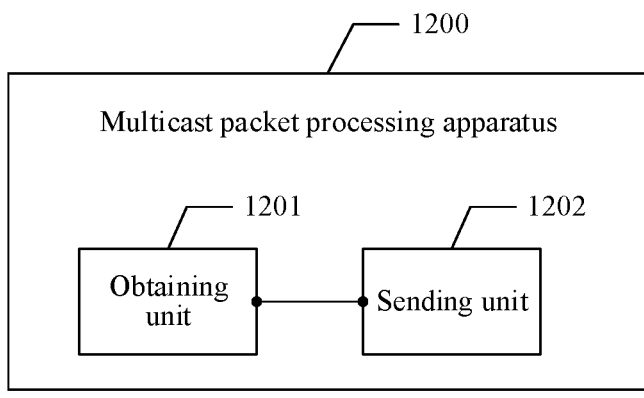
FIG. 12 is a schematic structural diagram of a multicast packet processing apparatus according to an embodiment of this application.

FIG. 12 is a schematic structural diagram of a multicast packet processing apparatus according to an embodiment of this application. A multicast packet processing apparatus 1200 includes:

an obtaining unit 1201, configured to:

obtain a first multicast packet, where destination information of the first multicast packet includes a first identifier, a second identifier, and a third identifier, the first identifier indicates link information, the second identifier indicates a replication and forwarding operation, and the third identifier is used to index destination information corresponding to a second node;

obtain a second multicast packet based on the first multicast packet and the third identifier, where destination information of the second multicast packet is the destination information corresponding to the second node; and obtain a third multicast packet based on the first multicast packet and the second identifier, where destination information of the third multicast packet is destination information corresponding to a third node that is determined based on a destination information index corresponding to a multicast packet obtained after the first multicast packet is replicated; and a sending unit 1202, configured to:

send the second multicast packet to the second node based on a link indicated by the first identifier; and send the third multicast packet to the third node based on a link indicated by destination information of the multicast packet that is obtained after the first multicast packet is replicated.

In some optional embodiments, the destination information of the first multicast packet further includes a fourth identifier, and the fourth identifier indicates a quantity of times of replication, or the fourth identifier indicates a quantity of multicast packets obtained after replication.

In some optional embodiments, the second identifier further indicates a quantity of times of replication.

In some optional embodiments, the third identifier is a sequence number of the destination information corresponding to the second node.

In some optional embodiments, the obtaining unit 1201 is specifically configured to:

query a destination information list based on the third identifier, and obtain the destination information corresponding to the second node, where destination information corresponding to the third identifier in the destination information list is the destination information corresponding to the second node; and replace the destination information of the first multicast packet with the destination information corresponding to the second node, and obtain the second multicast packet.

In some optional embodiments, the obtaining unit 1201 is specifically configured to:

replicate the first multicast packet based on the second identifier, and obtain destination information included in a next entry that is in the destination information list and that is of a list item matching the destination information of the first multicast packet, where the destination information included in the next entry is the destination information corresponding to the multicast packet obtained after the first multicast packet is replicated;

index the destination information list based on the destination information included in the next entry, and obtain the destination information corresponding to the third node; and replace destination information of the replicated first multicast packet with the destination information corresponding to the third node, and obtain the third multicast packet.

In some optional embodiments, the obtaining unit 1201 is specifically configured to:

obtain, based on the destination information list and a fourth multicast packet from a multicast source, destination information corresponding to the first node, where the destination information corresponding to the first node includes destination information included in a first entry in the destination information list; and obtain the first multicast packet based on the fourth multicast packet and the destination information corresponding to the first node.

In some optional embodiments, the first multicast packet further includes a plurality of pieces of sequentially arranged destination information included in the destination information list.

In some optional embodiments, the destination information list is a SID list included in the first multicast packet, the destination information list is a SID list configured by the first node, or the destination information list is a correspondence list configured by the first node.

In some optional embodiments, if the first multicast packet is an SRv6 packet, the first identifier is included in a locator field of the SRv6 packet, the second identifier is included in a function field of the SRv6 packet, and the third identifier is included in an argument field of the SRv6 packet.

In some optional embodiments, if the first multicast packet is an SRv6 packet, the first identifier is included in a locator field of the SRv6 packet, the second identifier is included in a function field of the SRv6 packet, and both the third identifier and the fourth identifier are included in an argument field of the SRv6 packet.

The multicast packet processing apparatus 1200 may perform operations performed by the first node in embodiments shown in FIG. 1 to FIG. 11, and details are not described herein again.

Figure 13:
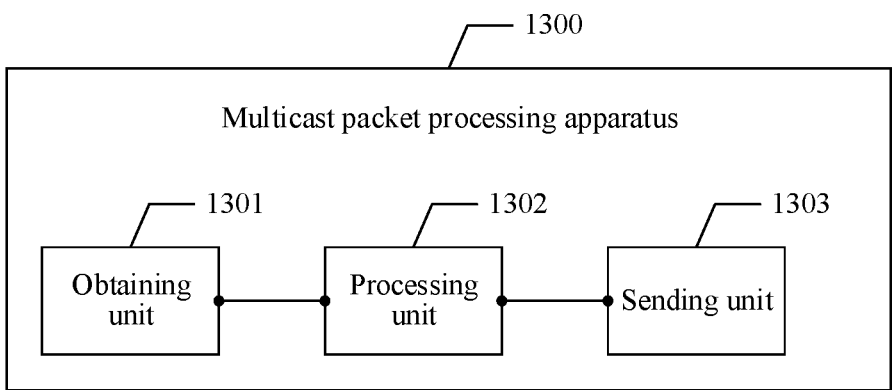
FIG. 13 is another schematic structural diagram of a multicast packet processing apparatus according to an embodiment of this application.

FIG. 13 is a schematic structural diagram of a multicast packet processing apparatus according to an embodiment of this application. A multicast packet processing apparatus 1300 includes:

an obtaining unit 1301, configured to obtain a transmission requirement of a first multicast packet and attribute information of communication links in a multicast system; and a processing unit 1302, configured to:

determine transmission link information of the first multicast packet based on the transmission requirement and the attribute information, where the transmission link information indicates a link set used for transmitting the first multicast packet in the multicast system.

The communication link set is encoded to obtain a destination information list. The destination information list includes destination information corresponding to the first multicast packet, and the destination information of the first multicast packet includes a first identifier that indicates link information, a second identifier that indicates a replication and forwarding operation, and a third identifier used to index destination information corresponding to a second node.

In some optional embodiments, the multicast packet processing apparatus 1300 further includes a sending unit 1303. The sending unit 1303 is configured to send the destination information list to a head node in a multicast system.

The multicast packet processing apparatus 1300 may further perform operations performed by a management node in embodiments shown in FIG. 1 to FIG. 11, and details are not described herein again.

In some optional embodiments, the multicast packet processing apparatus 1300 may further perform operations performed by the first node in embodiments shown in FIG. 1 to FIG. 11, and details are not described herein again.

Figure 14:
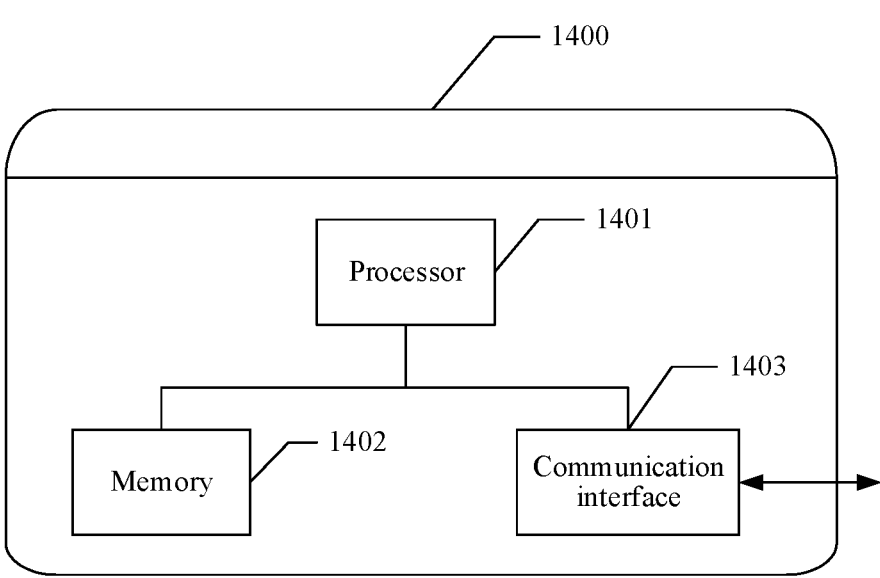
FIG. 14 is a schematic structural diagram of a network device according to an embodiment of this application.

The following describes a network device provided in an embodiment of this application. FIG. 14 is a schematic structural diagram of a network device according to an embodiment of this application. A network device 1400 includes a processor 1401 and a memory 1402. The memory 1402 stores one or more application programs or data.

The memory 1402 may be volatile storage or persistent storage. The program stored in the memory 1402 may include one or more modules, and each module may be configured to perform a series of operations performed by the network device 1400. Further, the processor 1401 may communicate with the memory 1402, and perform, on the network device 1400, a series of instruction operations in the memory 1402. The processor 1401 may be a central processing unit (CPU), or may be a single-core processor. In addition, the processor 1401 may be another type of processor, for example, a dual-core processor. This is not specifically limited herein.

The network device 1400 may further include one or more communication interfaces 1403 and one or more operating systems, such as a Windows Server™, a Mac OS X™, a Unix™, a Linux™, and a FreeBSD™.

The network device 1400 may perform operations performed by the first node or the management node in embodiments shown in FIG. 1 to FIG. 11. Details are not described herein again.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

What is claimed is:

1. A method, wherein the method is applied to a first node, and the method comprises:

obtaining a first multicast packet, wherein destination information of the first multicast packet comprises a first identifier, a second identifier, and a third identifier, the first identifier indicates link information, the second identifier indicates a replication and forwarding operation, and the third identifier is used to index destination information corresponding to a second node;

obtaining a second multicast packet based on the first multicast packet and the third identifier, wherein destination information of the second multicast packet is the destination information corresponding to the second node;

obtaining a third multicast packet based on the first multicast packet and the second identifier, wherein destination information of the third multicast packet is destination information corresponding to a third node, and the third node is determined based on a destination information index corresponding to a multicast packet obtained after the first multicast packet is replicated;

sending the second multicast packet to the second node based on a link indicated by the first identifier; and sending the third multicast packet to the third node based on a link indicated by destination information of the multicast packet that is obtained after the first multicast packet is replicated.

2. The method according to claim 1, wherein the destination information of the first multicast packet further comprises a fourth identifier, and the fourth identifier indicates a quantity of times of replication, or the fourth identifier indicates a quantity of multicast packets obtained after replication.

3. The method according to claim 1, wherein the second identifier further indicates a quantity of times of replication.

4. The method according to claim 1, wherein the third identifier is a sequence number of the destination information corresponding to the second node.

5. The method according to claim 1, wherein obtaining the second multicast packet comprises:

querying a destination information list based on the third identifier;

obtaining the destination information corresponding to the second node, wherein destination information corresponding to the third identifier in the destination information list is the destination information corresponding to the second node;

replacing the destination information of the first multicast packet with the destination information corresponding to the second node; and obtaining the second multicast packet.

6. The method according to claim 5, wherein obtaining the third multicast packet comprises:

replicating the first multicast packet based on the second identifier;

obtaining destination information comprised in a next entry that is in the destination information list and that is of a list item matching the destination information of the first multicast packet, wherein the destination information comprised in the next entry is the destination information corresponding to the multicast packet obtained after the first multicast packet is replicated;

indexing the destination information list based on the destination information comprised in the next entry;

obtaining the destination information corresponding to the third node;

replacing destination information of the replicated first multicast packet with the destination information corresponding to the third node; and obtaining the third multicast packet.

7. The method according to claim 5, wherein the first node is a head node, and wherein obtaining the first multicast packet comprises:

obtaining, based on the destination information list and a fourth multicast packet from a multicast source, destination information corresponding to the first node, wherein the destination information corresponding to the first node comprises destination information comprised in a first entry in the destination information list; and obtaining the first multicast packet based on the fourth multicast packet and the destination information corresponding to the first node.

8. The method according to claim 7, wherein the first multicast packet further comprises a plurality of pieces of sequentially arranged destination information comprised in the destination information list.

9. The method according to claim 5, wherein the destination information list is a segment identifier (SID) list comprised in the first multicast packet, the destination information list is a SID list configured by the first node, or the destination information list is a correspondence list configured by the first node.

10. The method according to claim 1, wherein if the first multicast packet is a segment routing over internet protocol version 6 (SRv6) packet, the first identifier is comprised in a locator field of the SRv6 packet, the second identifier is comprised in a function field of the SRv6 packet, and the third identifier is comprised in an argument field of the SRv6 packet.

11. An apparatus, comprising:

at least one processor; and at least one memory coupled to the at least one processor and storing programming instructions for execution by the at least one processor to:

obtain a first multicast packet, wherein the apparatus is a first node, destination information of the first multicast packet comprises a first identifier, a second identifier, and a third identifier, the first identifier indicates link information, the second identifier indicates a replication and forwarding operation, and the third identifier is used to index destination information corresponding to a second node;

obtain a second multicast packet based on the first multicast packet and the third identifier, wherein destination information of the second multicast packet is the destination information corresponding to the second node; and obtain a third multicast packet based on the first multicast packet and the second identifier, wherein destination information of the third multicast packet is destination information corresponding to a third node, and the third node is determined based on a destination information index corresponding to a multicast packet obtained after the first multicast packet is replicated; and send the second multicast packet to the second node based on a link indicated by the first identifier; and send the third multicast packet to the third node based on a link indicated by destination information of the multicast packet that is obtained after the first multicast packet is replicated.

12. The apparatus according to claim 11, wherein the destination information of the first multicast packet further comprises a fourth identifier, and the fourth identifier indicates a quantity of times of replication, or the fourth identifier indicates a quantity of multicast packets obtained after replication.

13. The apparatus according to claim 11, wherein the second identifier further indicates a quantity of times of replication.

14. The apparatus according to claim 11, wherein the third identifier is a sequence number of the destination information corresponding to the second node.

15. The apparatus according to claim 11, wherein the programming instructions are for execution by the at least one processor to:

query a destination information list based on the third identifier, obtain the destination information corresponding to the second node, wherein destination information corresponding to the third identifier in the destination information list is the destination information corresponding to the second node;

replace the destination information of the first multicast packet with the destination information corresponding to the second node; and obtain the second multicast packet.

16. The apparatus according to claim 15, wherein the programming instructions are for execution by the at least one processor to:

replicate the first multicast packet based on the second identifier;

obtain destination information comprised in a next entry that is in the destination information list and that is of a list item matching the destination information of the first multicast packet, wherein the destination information comprised in the next entry is the destination information corresponding to the multicast packet obtained after the first multicast packet is replicated;

index the destination information list based on the destination information comprised in the next entry;

obtain the destination information corresponding to the third node;

replace destination information of the replicated first multicast packet with the destination information corresponding to the third node; and obtain the third multicast packet.

17. The apparatus according to claim 15, wherein the programming instructions are for execution by the at least one processor to:

obtain, based on the destination information list and a fourth multicast packet from a multicast source, destination information corresponding to the first node, wherein the destination information corresponding to the first node comprises destination information comprised in a first entry in the destination information list; and obtain the first multicast packet based on the fourth multicast packet and the destination information corresponding to the first node.

18. The apparatus according to claim 17, wherein the first multicast packet further comprises a plurality of pieces of sequentially arranged destination information comprised in the destination information list.

19. The apparatus according to claim 15, wherein the destination information list is a segment identifier (SID) list comprised in the first multicast packet, the destination information list is a SID list configured by the first node, or the destination information list is a correspondence list configured by the first node.

20. The apparatus according to claim 11, wherein if the first multicast packet is a segment routing over internet protocol version 6 (SRv6) packet, the first identifier is comprised in a locator field of the SRv6 packet, the second identifier is comprised in a function field of the SRv6 packet, and the third identifier comprised in an argument field of the SRv6 packet.

* * * * *